(12) United States Patent
Gray et al.

(10) Patent No.: US 6,412,033 B1
(45) Date of Patent: Jun. 25, 2002

(54) METHOD AND APPARATUS FOR DATA AND ADDRESS TRANSMISSION OVER A BUS

(75) Inventors: David R. Gray, Hillsboro; Mark A. Gonzales, Portland; Linda J. Rankin, Beaverton, all of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/189,900

(22) Filed: Nov. 10, 1998

Related U.S. Application Data

(63) Continuation of application No. 08/826,319, filed on Mar. 27, 1997, now Pat. No. 5,898,894, which is a continuation of application No. 08/630,789, filed on Apr. 10, 1996, now abandoned, which is a continuation of application No. 08/268,290, filed on Jun. 30, 1994, now abandoned, which is a continuation of application No. 07/954,722, filed on Sep. 29, 1992, now abandoned.

(51) Int. Cl.⁷ .............................................. G06F 13/38
(52) U.S. Cl. ...................... 710/128; 710/129; 710/105; 710/106; 710/127; 710/60
(58) Field of Search .................................. 710/126–129, 710/58–61, 52–57, 33–35, 107, 110, 105–106

(56) References Cited

U.S. PATENT DOCUMENTS

| 4,456,965 A | | 6/1984 | Graber et al. | |
|---|---|---|---|---|
| 4,490,785 A | * | 12/1984 | Strecter et al. | 710/128 |
| 4,507,732 A | * | 3/1985 | Catiller et al. | 710/128 |
| 4,646,075 A | | 2/1987 | Andrews et al. | |
| 4,701,841 A | | 10/1987 | Goodrich et al. | |
| 4,749,990 A | | 6/1988 | Birkner | |
| 4,779,190 A | * | 10/1988 | O'Dell et al. | 710/129 |
| 4,853,846 A | | 8/1989 | Johnson et al. | |
| 4,982,321 A | | 1/1991 | Pantry et al. | |
| 5,046,004 A | | 9/1991 | Tsumura et al. | |
| 5,109,517 A | | 4/1992 | Houda et al. | |
| 5,175,826 A | | 12/1992 | Begun et al. | |
| 5,359,717 A | * | 10/1994 | Bowles et al. | 710/129 |
| 5,414,820 A | * | 5/1995 | McFarland et al. | 710/129 |
| 5,426,739 A | * | 6/1995 | Lin et al. | 710/128 |
| 5,506,973 A | * | 4/1996 | Okazawa et al. | 710/126 |
| 5,700,240 A | | 12/1997 | Barwick, Jr. et al. | |

OTHER PUBLICATIONS

Dave Bursky, Memory–CPU Interface Speeds Up Data Transfers, Electronic Design, Mar. 19, 1992, pp. 137–142.

* cited by examiner

Primary Examiner—Robert Beausoleil
Assistant Examiner—Raymond N Phan
(74) Attorney, Agent, or Firm—Blakely, Sokoloff, Taylor & Zafman LLP

(57) ABSTRACT

A computer architecture that includes a high speed, low pin bus that directly couples a microprocessor to the physical memory of the processor. Physical memory typically has a number of dynamic random access memory (DRAM) devices. The bus is a byte wide and has a data rate of approximately 500 Mbytes/sec. The high speed bus may be coupled with a conventional bus, so that conventional devices can communicate with the processor using existing bus protocols. The present invention includes a processor interface that allows the processor to communicate using the protocol of either bus. The interface also allows communication between devices on either bus. Also included is a system that incorporates cache memory on a high speed memory bus and a method for allowing I/O devices to be placed on both a conventional bus and the separate high speed bus.

54 Claims, 4 Drawing Sheets

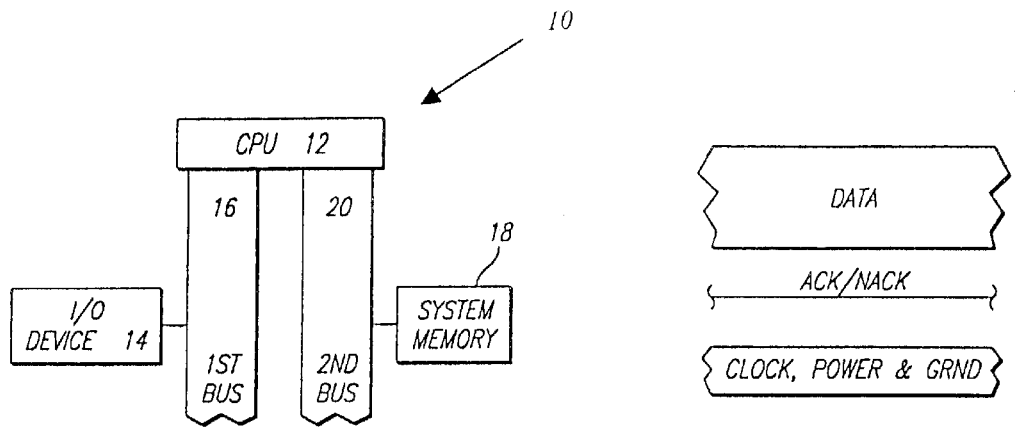
FIG. 1
FIG. 2
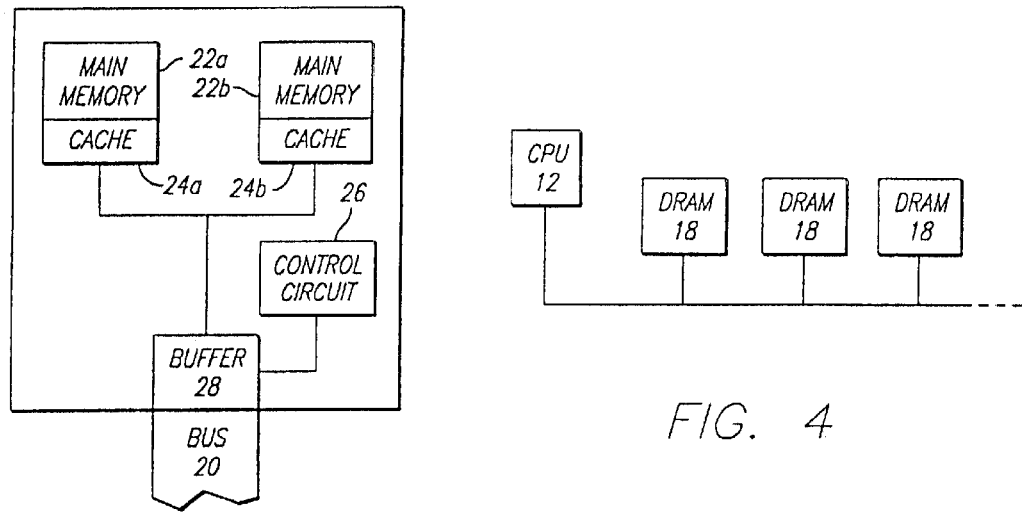
FIG. 3
FIG. 4
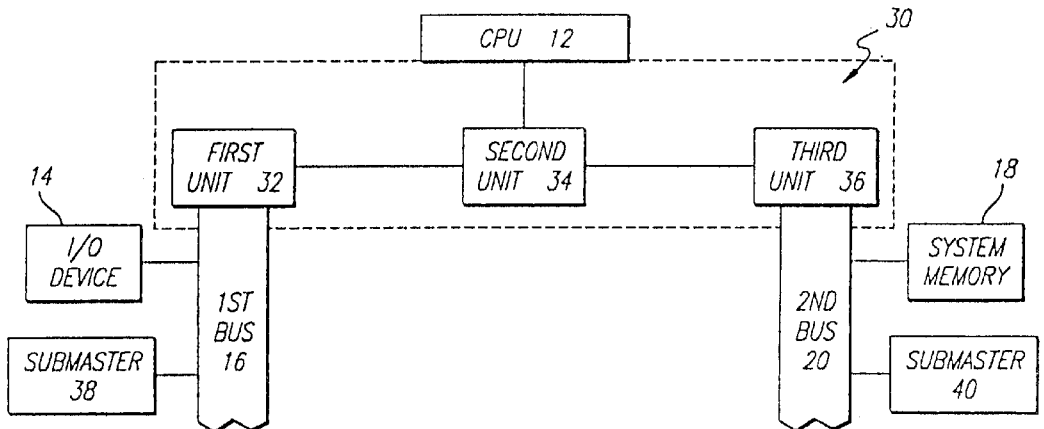
FIG. 5

METHOD AND APPARATUS FOR DATA AND ADDRESS TRANSMISSION OVER A BUS

This United States (US) Patent Application filed by inventors Gray et al is a continuation of U.S. patent application Ser. No. 08/826,319, filed on Mar. 27, 1997, now U.S. Pat. No. 5,898,894, which is a continuation of U.S. patent application Ser. No. 08/630,789, filed on Apr. 10, 1996, now abandoned, which is a continuation of U.S. patent application Ser. No. 08/268,290, filed on Jun. 30, 1994, now abandoned, which is a continuation of U.S. patent application Ser. No. 07/954,722, filed on Sep. 29, 1992, now abandoned, and claims the benefits thereof.

BACKGROUND OF THE INVENTION

1. Field of the Invention

The present invention generally relates to computer architecture.

2. Description of Related Art

Conventional computer architecture typically includes a single bus that couples a microprocessor with memory and Input/Output (I/O) devices. The bus carries a number of electrical signals between the various components of the system. The speed of the signals is somewhat dictated by the length of the bus. High speed signals are difficult to send over long distances, because of the cross inductance between bus lines. Generally speaking, higher frequencies require shorter bus lines.

I/O ports are typically located on a separate card, whereby the signals must travel through connectors and various printed circuit boards to communicate with of the processor. This limits the speed of the bus and degrades the performance of the processor. The bus speed also controls the rate of data transfer between the processor and memory devices. It is generally desirable to have high data rates between the processor and memory. Usually an increase in data rate requires a larger number of pins on the chip. Adding pins enlarges the size of the chip, increasing the cost and complexity of the same. It would therefore be desirable to have a high speed memory bus that would provide a high data rate with a minimal amount of pins. It would also be desirable to have an architecture that would allow such a high speed bus to operate independently of the I/O devices of the system.

Microprocessors are constantly being redesigned to run at faster clock rates. Usually the development of faster CPU devices require the addition of hardware and/or software, so that the existing system can interface with the new processor. This is particularly true for the interface between the processor and the bus, which contains existing I/O devices that run at the slower data rate. Recent systems have incorporated various levels of cache memory to compensate for the slow data rate between the processor and main memory. Additionally, cache requires additional components, thereby increasing the cost and complexity of the system. It would therefore be desirable to have an architecture that would allow faster processors to be installed into existing systems, without having to drastically change the existing hardware and software of the system.

SUMMARY OF THE INVENTION

The present invention is a computer architecture that includes a high speed, low pin bus that directly couples a microprocessor to the physical memory of the processor. Physical memory typically has a number of high speed dynamic random access memory (DRAM) devices. The bus is a byte wide and has a data rate of approximately 500 Mbytes/sec. The high speed bus greatly increases the performance between the processor and memory devices. High speed processors can be substituted or added to the system, without drastically modifying the existing memory and bus. High speed I/O devices such as graphic controllers can also be added to the bus to improve the performance of the controller.

The high speed bus may be used with a conventional bus, so that conventional devices (e.g. I/O devices, system ROMs, etc.) can communication with the processor using existing bus protocols. The dual bus arrangement allows high speed data rates between the processor and memory to occur, while slower devices communicate with the processor on the conventional bus. The present invention includes a processor interface that allows the processor to communicate using the protocol of either bus. The interface also allows data to be transferred between the busses. For example, if the conventional bus is connected to I/O devices, I/O data can be diverted directly to the high speed bus and memory. Conversely if the high speed bus contains an I/O device, the device can communicate with the conventional bus.

The present invention includes means to incorporate cache memory on a high speed memory bus and a method for allowing I/O devices to be placed on both the conventional bus and the separate high speed bus.

Therefore it is an object of this invention to provide a high speed low pin bus between a processor and system memory.

It is also an object of this invention to provide a high speed memory bus that allows faster processors to be substituted or added, without changing the bus or memory structure.

It is also an object of this invention to provide a high speed memory bus that can operate with a conventional bus.

It is also an object of this invention to provide a method for allowing I/O devices to be placed on both a high speed bus and a conventional bus.

It is also an object of this invention to provide a cache on a high speed memory bus.

It is also an object of this invention to provide a multiple bus architecture that allows devices on one bus to communicate with devices on the other bus.

It is also an object of this invention to provide a computer architecture that decouples the performance of the CPU to memory path from the CPU to I/O path.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a schematic of a system of the present invention, showing two busses connected to a microprocessor;

FIG. 2 is a schematic of a high speed bus line of the present invention;

FIG. 3 is a schematic of a high speed DRAM with an internal cache;

FIG. 4 is a schematic showing a number of DRAM's on a high speed bus;

FIG. 5 is a schematic showing a processor interface connected to a pair of busses;

DETAILED DESCRIPTION OF THE INVENTION

Figure 6:
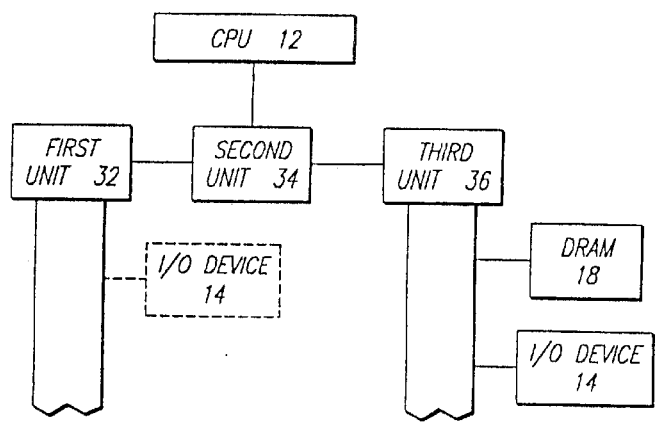
FIG. 6 is a schematic showing a dual bus architecture with an I/O device on a high speed bus.

Referring to the drawings more particularly by reference numbers, FIG. 1 shows a schematic of a computer system 10 of the present invention. The system 10 includes a central processing unit (CPU) 12 that is coupled to an I/O device(s) 14 by a first bus 16. The I/O device(s) 14 may include a printer, keyboard, screen or other conventional computer components that are connected to a microprocessor 12. The first bus 16 is a conventional system bus that may contain 16, 32 or 64 data lines (2, 4 or 8 byte data transfer), along with other additional address, control and power lines, as is known in the art. The first bus 16 typically transfers information at a first predetermined clock rate.

The processor 12 is coupled to a memory device(s) 18 by a second bus 20. The memory device 18 typically contains system memory for the computer 10. FIG. 2 shows a preferred embodiment of the second bus 20. The bus 20 has 9 data lines, which allows a byte of data plus a horizontal parity bit to be transferred during each clock cycle. Addresses and data are transferred in serial byte form. Unless otherwise distinguished, data will include both instruction and data. The bus 20 also has an ACK/NACK line to allow the memory device to transmit an ACK or NACK signal, along clock, power and ground lines. In the preferred embodiment, data is transferred on the second bus 500 Mbytes/sec (2 nanosecond clock).

The memory device 18 is preferably a dynamic random access memory (DRAM) chip. A DRAM is preferred because of the large memory content characteristics of the device. The memory device 18 is preferably placed in close physical proximity to the processor. By placing the memory and processor close together, a reliable very high speed bus can be established, which is not susceptible to errors due to line noise, etc. The second bus 20 provides a direct line between the processor 12 and memory 18. In this manner, the processor 12 to memory 18 protocol can be constructed independently from the rest of the computer. The second bus 20 allows a high speed processor 12 to be coupled to a high speed memory device 18 without being impeded by the speed of the I/O devices 14 or first bus 16.

As shown in FIG. 3, the DRAM may have two main blocks of memory 22a and 22b, each containing a 36×256× 256 array of memory cells. Each block has a cache 24a and 24b, that stores a row of data from the main memory block. The DRAM has a control circuit 26 to provide memory logic and a buffer 28 that provides an interface with the second bus 20. Such a memory device has been developed by Rambus, Inc.

The protocol of the second bus 20 and memory device 18 includes a request packet. The request packet includes the addresses that are being accessed within the memory device. The request packet also contains a start bit to indicate the start of the request packet and coded signals that indicate whether the transaction is a memory read or a memory write, and how many bytes of data are requested. The DRAM constantly monitors the second bus 20 for a request packet. If the addresses are in the cache of a DRAM, the DRAM provides an ACK signal on the ACK/NACK line and then either reads or writes the data. If the DRAM has the addresses but the addresses are not within cache, the DRAM will provide a NACK signal and perform an internal cache fetch of the requested address from main memory.

As shown in FIG. 4, the system memory 18 may have a number of DRAMs all connected parallel to the second bus 20. Because each memory device contains a large cache line of available data, the probability of a single DRAM cache line containing a requested address is quite high. This allows the DRAMs to operate independently of each other. Thus when an address request misses (not in cache) and the DRAM cache internally fetches the data for the new request, the data in the other DRAM caches are left undisturbed. The result is a large number of cache lines waiting to be accessed, greatly improving the probability of an address request being in one of the DRAMs caches.

As shown in FIG. 5, the processor 12 can be provided with a bus interface 30 that allows the processor 12 to communicate with the busses 16 and 20. The bus interface 30 contains a first unit 32, a second unit 34 and a third unit 36. The first unit 32 is connected to the first bus 16 and provides a conventional interface between the processor 12 and the I/O devices 14. The first unit 32 may contain a buffer to store data and means to allow the processor 12 to communicate with the protocol of the first bus 16.

The third unit 36 primarily serves the same function for the second bus 20. The third unit 36 has logic circuitry (not shown) which modifies the reques t from the CPU to conform to the protocol of the second bus 20. The third unit 36 generates a request packet that is sent to memory. The request packet includes the addresses requested, device id, and coded signals described above.

In operation, the CPU generates a request for memory. The third unit 36 generates a request packet which is sent to memory 18 on the second bus 20. If the transaction is a memory write, the third unit 36 will also send the data to be written. The DRAMs decode the device id. If the id matches, the DRAM will further decode the addresses requested. If the requested addresses are within cache, the DRAM will send an ACK signal to the third unit 36. If the transaction is a read, the DRAM will send the requested data onto the second bus 20.

If the address are within the DRAM but not within the DRAM's cache, the DRAM sends a NACK signal to the third unit 36 and then transfers the requested data from main memory into cache. The third unit 36 then resubmits the same request packet to memory. The cache now has the data which is sent to the third unit 36. The memory device 18 will typically transmit data at a higher rate than the rate at which the processor 12 reads the data. The third unit 36 will therefore have a buffer which stores the data as it is received from memory. With a byte wide second bus 20, the third unit 36 will store each byte of data as it is received from memory. The processor 12 can then retrieve the data at its leisure. Likewise, when the processor writes to memory, the data can be stored within the buffer, while the third unit 36 sends the data onto the second bus 20, byte by byte.

One of the functions of the second unit 34 is to direct address request from the CPU 12 to the appropriate bus.

When the processor 12 writes data, the second unit 34 looks at the addresses being written and directs the data to the appropriate bus. For example, the computer can be mapped so that memory is given certain designated addresses (0–79 K) and I/O is given another range of addresses (80K–119K). If the processor 12 sends out a packet to write addresses 64–128, the second unit 34 will store and compare the first and last addresses in the address packet. The addresses are compared to a stored value that represents the line between memory and I/O. If the stored value is 80K, then all addresses less than the stored value are directed to the second bus 20. Addresses equal to or greater than the stored value are directed to the first bus 16. In the example above, because the addresses 64 and 128 are less than 80K, the address write packet is sent to memory on the second bus 20. When the processor 12 sends out a read request, the second unit 34 again maps the request to the appropriate bus. The second unit 34 may also allow both busses to transfer data at the same time. For instance, while the processor 12 is writing data to I/O 14, the memory device 18 can be writing data to the third unit 36 which stores the data until retrieved by the processor 12.

The second unit 34 can also direct request between the busses 16 and 20. For example, submasters 38 and 40 may be connected to the first 16 and second 20 busses respectively. Submaster 38 may be a math coprocessor and submaster 40 may be a graphic controller. The coprocessor 38 may generate a read request which is provided onto the first bus 16. The first unit 32 provides the request to the second unit 34, which determines whether the requested addresses are located on the second bus 20. If the requested addresses are on a device on the second bus 20, the second unit 34 sends the request to the third unit 36. The third unit 36 generates a read request packet that is sent onto the second bus 20. If the addresses are within a DRAM, the cache ACK/NACK cycle is performed and the data is sent to the third unit 36 which transfers the data to the coprocessor 38 via the first unit 32. Similarly when the controller 40 generates a request, the second unit 34 determines if the requested addresses are located on the first bus 16 and directs the request accordingly. Either the coprocessor 38 or controller 40 may have dedicated internal caches. When one of the submasters generates a write into the cache of the DRAM, the second unit 34 will invalidate the caches of the CPU and other submaster that also contains the write address. For example, if the graphic controller generates a DRAM cache write of addresses 0-15, the addresses are also sent to the second unit 34 which initiates a cache invalidation cycle on the first bus 16. Thus if the CPU cache or coprocessor cache contains the addresses 0-15, those lines in the caches are invalidated. This prevents the other (sub) masters from processing invalid data from their internal cache.

The second unit 34 is also capable of "rolling up" address request from the CPU 12. A conventional CPU may establish a predetermined memory map that is incompatible with a dual bus system. For example, the conventional CPU may map the first 640K of memory to the DRAM's and the next block of addresses (640K–767K) to an I/O device. As shown in FIG. 6, the computer may have a dual bus architecture with the I/O device (640K–767K) placed on the second bus 20. The system may also have memory on the second bus with 4.0 Mbytes of memory. It is not possible to leave a gap in the address range that the memory will respond to (0 to 4.0 Mbyte is this example), so the I/O device on the second bus 20 cannot be allocated the block of addresses 640–767K it would normally respond to on the second bus 20. Instead the I/O device 60 it is allocated a new and otherwise unused block of addresses, typically above the memory on the second bus 20. When the CPU generates a read request for addresses within the 640K–767K block, the second unit 12 of the present invention remaps the addresses for the I/O device to address locations above the memory of the DRAM. Using the above example, the second unit 12 may change the addresses associated with space 640K–767K to addresses associated with space 4.0–4.12 Mbytes. This remapping of addresses allows I/O devices to be located on the second bus in a manner which allows them to co-exist with any amount of memory devices without requiring any software changes. The "roll up" feature allows I/O devices to be added to a memory bus without changing the CPU mapping scheme.

Figure 7:
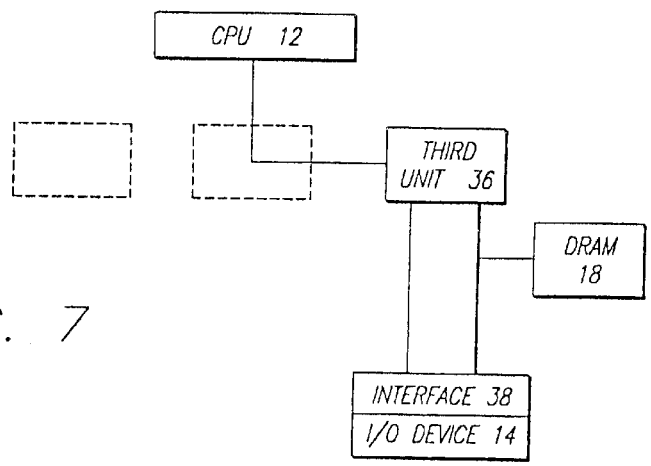
FIG. 7 is a schematic showing a single high speed bus with both I/O and memory devices.

FIG. 7 shows a system where memory and I/O devices are both connected to the high speed second bus 20, which may or may not coexist with the first bus 16. The I/O device 14 is constructed to meet the protocol of the second bus 20. In the alternative, the I/O device 14 may have an interface 38 that allows the device 14 to meet the protocol of the second bus 20. The interface 38 being constructed to function in the same manner as the third unit 36.

The addition of an I/O device 14 on the high speed bus creates a means for providing high data rates between the device 14 and memory 18. Such an arrangement is particularly useful when the I/O device is a graphics control card, wherein large bandwidths of data can be transferred between the devices 14 and 18. The memory devices are preferably the cache DRAM's described above. The high probability of "hits" in the DRAM's cache, greatly increases the speed and performance of the graphic controller 14.

Figure 8:
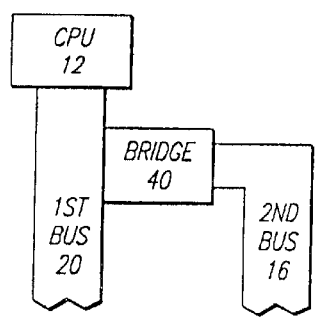
FIG. 8 is a schematic showing a high speed bus connected to a conventional bus by a bridge.

FIG. 8 shows another embodiment of the system, wherein the second bus 20 is coupled to the first bus 16 by a bridge 40. System memory or a high speed I/O device (graphic controller) may be connected to the second bus. The bridge 40 functions in a similar manner to the third unit 36 in FIG. 5, serving to convert the data from the second bus 20 to meet the protocol of the first bus 14 and vice versa. Such an arrangement allows high speed memory or I/O devices to be added to existing computer systems through the second bus 20, without drastically changing the microprocessor 12.

Figure 9:
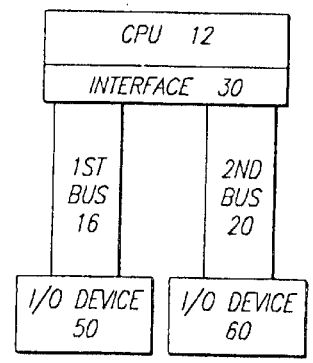
FIG. 9 is a schematic showing I/O devices on each bus of a dual bus architecture.

FIG. 9 shows another embodiment of the present invention, with I/O devices 50 and 60 on the first bus 16 and the second bus 20, respectively. I/O device 60 may have an interface to match the protocol of the second bus 20. When the processor 12 sends out a write packet, it sends the data onto both busses 16 and 20. The I/O devices with the corresponding write addresses will then write the data from the bus. When the processor sends out a read request, the request is again sent out onto both busses. If I/O device 60 on the second bus 20 has the addressed data, the device 60 will send an ACK signal to the interface 30. The interface contains a timer circuit that is coupled to a bus multiplexer. When the processor generates a request, the timer is activated and the bus multiplexer is set to receive data only from the second bus. The interface 30 then reads the data on the second bus 20 and ignores any data on the first bus 16. If the device 60 on the second bus 20 does not have the addressed data, no acknowledge is sent before the timer expires. Upon expiration of the timer, the bus multiplexer switches to the first bus so that the interface 30 reads the data on the first bus 16.

The processor may send out a read request such that part of the request is located in I/O device 60 and the remainder of the request in device 50. The CPU request is converted to a request packet as described above when sent to the second I/O device 60. The request packet typically requests multiple bytes of data. Therefore the second I/O device will always send multiple bytes of data. Not all of the data bytes sent to the CPU 12 by the second I/O device 60 may be valid. The I/O device 60 on the second bus 20 then sends an enable code (typically a byte wide) which indicates to the processor 12 which bytes of the data package on the second bus 20 are valid. Each bit in the enable byte may correlate to each data byte. For example, if the data block is 8 bytes long, then each bit (0–7) of the enable byte may correspond to a corresponding byte (0–7) of data. The least significant bit within the enable byte may correlate to the first data byte, the most significant bit may correlate to the last data byte and so forth and so on. If the enable bit is a binary 0, then the corresponding byte may have valid data, a binary 1 may indicate invalid data. The processor 12 may then replaces all of the invalid bytes from the second bus 20 with the valid bytes from the first bus 16.

Figure 9A:
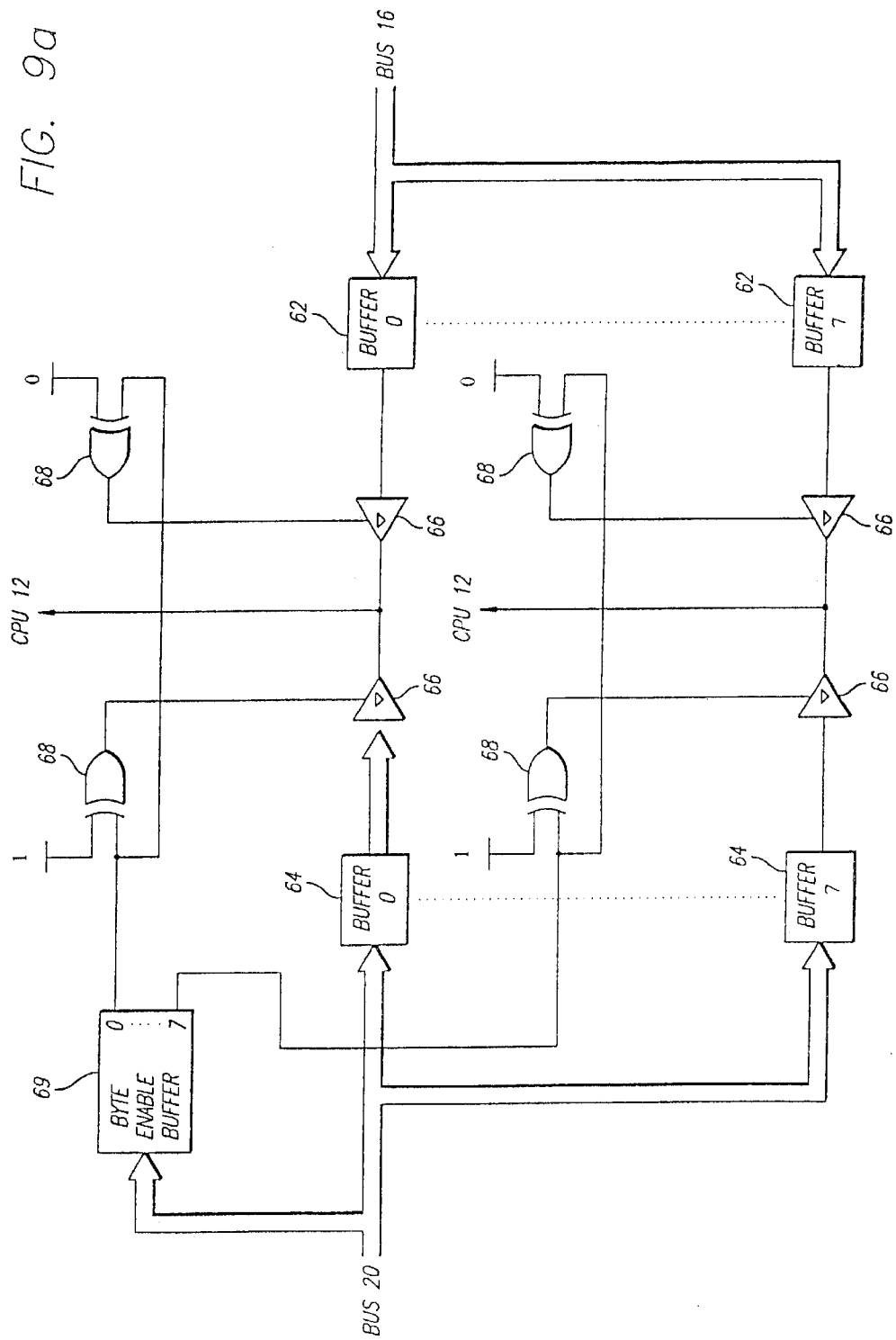
FIG. 9a is a schematic of the CPU interface.

FIG. 9a shows a schematic for the interface 30 which allows invalid data on the second bus 20 to be replaced with valid data on the first bus 16. The interface has a plurality of first buffers 62 that store the data from the first bus 16. Each buffer 62 may store a byte of data. The interface 30 may also have a plurality of second buffers 64 that each store a byte of data from the second bus 20. The output of each buffer is connected to a tri-state buffer 66. The enable pin of the tri-state buffer 66 is connected to the output of an exclusive OR (XOR) gate 68. The XOR gates 68 of the first bus 16 have an input connected to a stored binary 0. The XOR gates 68 of the second bus 20 have an input connected to a stored binary 1. The other inputs of the XOR gates are connected to a byte enable buffer 69 which stores the enable byte on the second bus 20.

In operation, the buffers 62 and 64 store all of the data from both the first bus 16 and second 20 bus, respectively. The CPU 12 is then provided with the correct data in accordance with the data bit string in the enable byte provided by the I/O device 60 on the second bus 20.

For example, the I/O device 60 may send 8 bytes of data, the first 4 bytes being valid, the subsequent 4 bytes being invalid. The I/O device 60 may then send an enable byte 00001111. The first 4 bits of the enable byte may correspond to the first 4 bytes of data. The 0's are provided to the XOR gates 68, which enable the corresponding tri-state buffers to send the data stored in the second buffers 64 (0–3) to the CPU 12. The 1's of the enable byte are XORed with the XOR gates 68, so that the tri-state buffers 66 of the second buffers 64 are disabled and the tri-state buffers 66 of the first buffers 62 are enabled. The data from the first buffers 62 (4–7) is then provided to the CPU 12.

The byte enable format could be used with the ACK signal described above, wherein the processor will ignore the first bus if the I/O device 60 sends an ACK signal. If the ACK signal is not incorporated, the processor always reads both busses. If all of the bytes from the second bus are valid, then the processor does not replace any of the second bus data with the first bus data. The first bus is essentially ignored the same as if an ACK was given to the processor.

Figure 10:
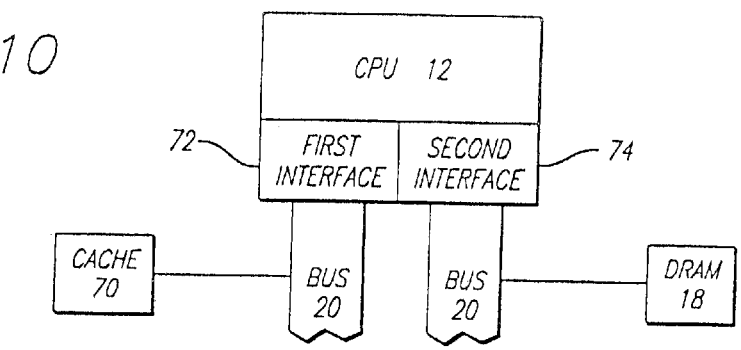
FIG. 10 is a schematic showing a cache located on a high speed memory bus.
Figure 11:
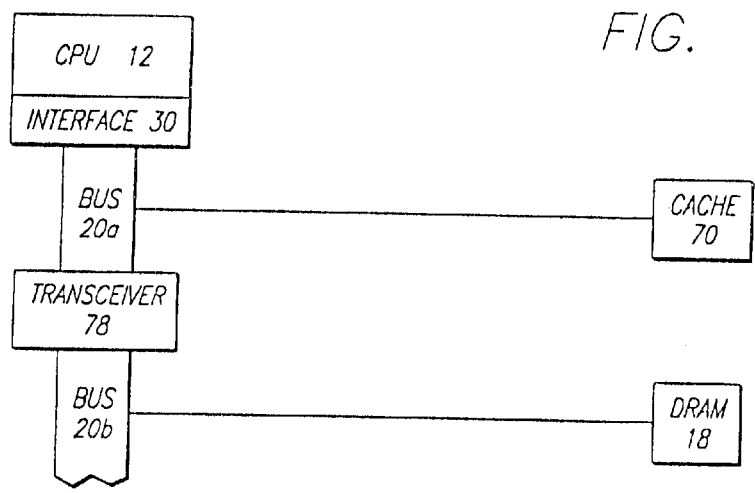
FIG. 11 is a schematic showing an alternate embodiment of a cache on a high speed memory bus.

FIGS. 10 and 11 show the incorporation of a cache 70 on a second bus 20 with high speed system memory devices. This embodiment may be incorporated with the dual bus architectures described above. The cache 70 typically includes high speed static RAMs that contain tags and data for a number of cache lines. The physical memory of the processor preferably contains the high speed DRAMs described above. In the first embodiment shown in FIG. 10, the CPU has two bus interfaces 72 and 74. The first interface 72 is connected to cache 74. The second interface is connected to the DRAM's 18. Both interfaces preferably meet the high speed bus protocol described above. The cache 70 may also have an interface that meets the requirements of the bus protocol. The cache interface will therefore be capable of reading a request packet from the CPU interface and generating an ACK or NACK signal in response. The CPU 12 typically generates all initial requests through interface 72.

When the processor 12 generates a read request, the cache 70 decodes the addresses to determine if it contains the requested data. If the address is within cache 70, the cache 70 sends an ACK signal to the processor 12 and the processor 12 reads the data. If the cache 70 does not have the data, the cache 70 will send a NACK signal to the processor 12. The processor 12 will then resubmit the read request packet through the second interface 74. The DRAM's 18 will then write the data to the processor 12. The requested data may also be written into cache 70 through the first interface 72. When the processor 12 issues a write, the data can be written to either the cache 70 alone, or to the cache 70 and system memory 18. If the CPU 12 generates a write request and the cache 70 contains the address, but with different data ("a dirty cache miss"), the cache 70 will generate a busy ACK signal and send the modified data to the CPU 12, which retransmits the same to the DRAM 18. The CPU 12 then resubmits the write request, wherein the data is stored in cache 70.

FIG. 11 is another embodiment showing the DRAM's 18 and cache 70 both coupled to a single CPU interface 30. The DRAM 18 is coupled to the interface 30 by a transceiver 78. When the processor 12 sends out a read request, the cache 70 decodes the addresses to determine if it will respond. If the cache 70 has the requested data, it will send an ACK signal to the processor 12. The ACK signal is also received by the transceiver 78 which prevents the DRAM from sending the data to the processor. If the cache 70 sends a NACK signal, the transceiver allows the DRAM to send the data to the processor 12. The processor 12 will also write the data from the DRAM back into cache 70. When the processor 12 sends a write package and the cache 70 sends an ACK signal to both the processor and the DRAM, the DRAM can either read the data with the cache, or the ACK signal can disable the DRAM so that it does not read the data.

Figure 12:
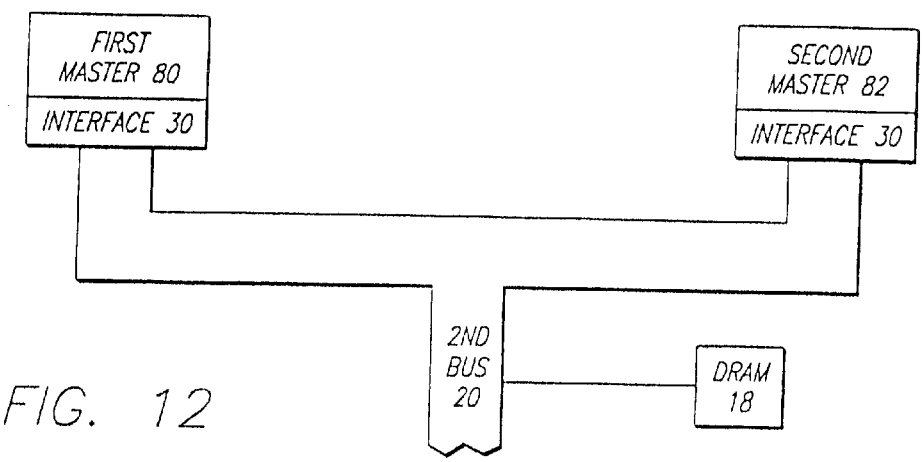
FIG. 12 is a schematic showing two CPU's connected to a bus that contains a DRAM with an internal cache.

FIG. 12 shows another embodiment of the present invention, wherein there are two masters 80 and 82 connected to the high speed bus 20 and DRAM's 18 with cache, described above. The masters are typically CPU's that can each access the DRAM's 18 on the bus 20. Each CPU has a bus interface 30 that generates a read request packet that is interpreted by the memory devices. The request packet may contain a lock bit which is either set (1) or not set (0). The masters constantly monitor the bus 20 to insure that another master has not sent a request packet with the lock bit set. Once a master sends a request with a set lock bit, the other master is prevented from making a request until the requesting matter submits a subsequent request with the lock bit not set. The lock bit allows a master to go through entire memory read and write cycles without corruption of the DRAM by another master.

Although a dual bus architecture is shown and described, it is to be understood that the present invention may incorporate more than two busses or processors.

While certain exemplary embodiments have been described in detail and shown in the accompanying drawings, it is to be understood that such embodiments are merely illustrative of and not restrictive on the present invention and that the invention not be limited to the specific arrangements and constructions shown and described, since various other modifications may occur to those ordinarily skilled in the art.

What is claimed is:

1. A computer system, comprising:
    a central processing unit (CPU) that generates a first data request packet to transceive data, said first data request packet including a start bit, a first address, and a code indicating a read or a write transaction and how many bytes of data are requested;
    a first bus connected to said CPU, said first bus including a control line and a plurality of first data lines, said first data lines to couple data into and out of said CPU at a first data rate; and,
    a second bus connected to said CPU, said second bus containing a control line and a plurality of second data lines, said second data lines to couple data into and out of said CPU at a second data rate in response to a data request packet, said second data rate greater than said first data rate.

2. The computer system as recited in claim 1, further comprising.
    a first I/O device connected to said first bus, said first I/O device being capable of generating a first data request on said first bus to cause a second data request packet to be generated on said second bus to transceive data, said second data request packet including a start bit, a second address and a code indicating a read or a write transaction and how many bytes of data are requested.

3. The computer system as recited in claim 2, further comprising:
    second I/O device connected to said second bus, said second I/O device being capable of generating a third data request packet on said second bus to transceive data, said third data request packet including a start bit, a third address, and a code indicating a read or a write transaction and how many bytes of data are requested.

4. The computer system as recited in claim 3, further comprising:
    a coprocessor connected to said first bus, said coprocessor being capable of generating a second data request on said first bus to cause a fourth data request packet to be generated on said second bus to transceive data, said fourth data request packet including a start bit, a fourth address, and a code indicating how many bytes of data are requested and whether a read or write transaction is requested.

5. The computer system as recited in claim 1, wherein said first address of said first request packet includes a device identification to identify one of a plurality of memory devices with which to transceive data.

6. The computer system as recited in claim 1, further comprising.
    a graphics controller connected to said second bus, said graphics controller being capable of generating a fifth data request packet on said second bus to transceive data, said fifth data request packet including a start bit, a third address, and a code indicating a read or a writ e transaction and how many bytes of data are requested.

7. The computer system as recited in claim 1, wherein said data coupled into and out of said CPU through said first bus includes data, addresses and instructions, and said data coupled into and out of said CPU through s aid second bus includes data, addresses and instructions.

8. A computer system comprising:
    a central processing unit (CPU) that generates a first data request that includes a first address,
    a first bus connected to said CPU, said first bus including a control line and a plurality of first data lines, said first data lines to couple data of said first bus at a first data rate into and out of said CPU, and,
    a second bus connected to said CPU, said second bus is a byte wide and includes a control line and a plurality of second data lines, said second data lines to transmit to and receive from said CPU data of said second bus at a second data rate, said second data rate is 500 Mbits/sec which is greater than said first data rate.

9. A computer system comprising:
    a central processing unit (CPU) that generates a first data request that includes a first address;
    a first bus connected to said CPU, said first bus including a control line and a plurality of first data lines that transmit to and from said CPU, address and data on said first data lines of said first bus at a first data rate;
    a second bus connected to said CPU, said second bus containing a control line and a plurality of second data lines that transmit to and from said CPU, address and data on said second data lines of said second bus at a second data rate, said second data rate of said address and said data on said second bus is greater than said first data rate of said address and said data on said first data bus;
    a memory device connected to said second bus; and
    a bus interface unit operatively connected to said CPU and said first bus and said second bus, said bus interface unit being adapted to receive said first data request and generate a request packet to be sent to said memory device, said request packet including said first address and a coded signal to indicate whether said first data request is a read or write.

10. The computer system as recited in claim 8, further comprising:
    a memory connected to said second bus.

11. The computer system as recited in claim 9, wherein said memory device generates an ACK signal if said first address is contained within said memory device, and said memory device generates a NACK signal if said first address is not contained within said memory device.

12. The computer system as recited in claim 10, wherein said memory generates an ACK signal if said first address is contained within said memory device, and said memory device generates a NACK signal if said first address is not contained within said memory device.

13. A computer system comprising:
    a central processing unit (CPU) that generates a first data request that includes a first address, said CPU including a bus interface unit,
    a first bus connected to said CPU, said first bus including a control line and a plurality of first data lines that transmit to and from said CPU, address and data on said first data lines of said first bus at a first data rate;
    a second bus connected to said CPU, said second bus containing a control line and a plurality of second data lines that transmit to and from said CPU address and data on said second data lines of said second bus at a second data rate, said second data rate of said address and said data on said second bus is greater than said first data rate of said address and said data on said first data bus;

a main memory device connected to said second bus;

at least one first I/O device connected to said first bus, said at least one first I/O device being capable of generating a second data request that includes a second address; and said bus interface unit of said CPU configured to receive said first data request and direct it to one of said first bus or said second bus in accordance with a value of said first address.

14. The computer system as recited in claim 13, further comprising:

a memory connected to said second bus.

15. The computer system as recited in claim 14, wherein said memory generates an ACK signal if said first address is contained within said memory device, and said memory device generates a NACK signal if said first address is not contained within said memory device.

16. A computer system comprising:

a central processing unit (CPU) that generates a first data request that includes a first address;

a first bus connected to said CPU, said first bus including a control line and a plurality of first data lines that transmit to and from said CPU, address and data on said first data lines of said first bus at a first data rate;

a second bus connected to said CPU, said second bus containing a control line and a plurality of second data lines that transmit to and from said CPU, address and data on said second data lines of said second bus at a second data rate, said second data rate of said address and said data on said second bus is greater than said first data rate of said address and said data on said first data bus;

a main memory device connected to said second bus;

at least one first I/O device connected to said first bus, said at least one first PO device being capable of generating a second data request that includes a second address;

a second PO device connected to said second bus, said second I/O device being capable of generating a third data request that includes a third address; and a bus interface unit operatively connected to said CPU and said first bus and said second bus, said bus interface unit being adapted to receive said third data request and direct said third data request to said first bus, said bus interface unit being further adapted to receive said second data request and direct said second data request to said second bus.

17. The computer system as recited in claim 16, wherein said second bus is a byte wide and said second data rate is 500 Mbits/sec.

18. The computer system as recited in claim 17, wherein said bus interface unit is adapted to received said first data request and generate a request packet to be sent to said memory, said request packet including said first address and a coded signal to indicate whether said first data request is a read or write.

19. The computer system as recited in claim 18, wherein said memory generates an ACK signal if said memory contains said first address, and said memory generates a NACK signal if said first address is not contained within said memory.

20. A computer system comprising:

a central processing unit (CPU) that generates a first data request that includes a first address;

a first bus connected to said CPU, said first bus including a control line and a plurality of first data lines that transmit to and from said CPU, address and data on said first data lines of said first bus at a first data rate;

a second bus connected to said CPU, said second bus containing a control line and a plurality of second data lines that transmit to and from said CPU, address and data on said second data lines of said second bus at a second data rate, said second data rate of said address and said data on said second bus is greater than said first data rate of said address and said data on said first data bus;

a main memory device connected to said second bus;

at least one first IO device connected to said first bus, said at least one first I/O device being capable of generating a second data request that includes a second address;

a second I/O device connected to said second bus, said second 110 device being capable of generating a third data request that includes a third address;

a coprocessor connected to said first bus, said coprocessor being capable of generating a fourth data request that includes a fourth address; and a bus interface unit operatively connected to said CPU and said first bus and said second bus, said bus interface unit being adapted to receive said second data request and said fourth data request and directing said second data request and said fourth data request to said second bus, said bus interface unit being further adapted to receive said third data request and direct said third data request to said first bus.

21. The computer system as recited in claim 20, wherein said second bus is a byte wide and said second data rate is 500 Mbits/sec.

22. The computer system as recited in claim 21, wherein said bus interface unit is adapted to receive said first data request and generate a request packet to be sent to said memory, said request packet including said first address and a coded signal to indicate whether said first request is a read or write.

23. The computer system as recited in claim 22, wherein said memory generates an ACK signal if said memory contains said first address, and said memory generates a NACK signal if said first address is not contained within said memory.

24. A computer system, comprising:

a central processing unit (CPU) that can generate a first data request that includes a first address;

a first bus connected to said CPU, said first bus being adapted to transmit data at a first data rate;

a second bus connected to said CPU, said second bus being adapted to transmit data at a second data rate, said second data rate being greater than said first data rate;

a first I/O device connected to said first bus, said first I/O device being adapted to provide at least one byte of data to said first bus;

a second I/O device connected to said second bus, said second I/O device being adapted to provide at least two bytes of data and a coded signal onto said second bus, said coded signal indicating which byte(s) of data are invalid; and, an I/O bus interface that is operatively connected to said CPU, said first bus, and said second bus to store said data from said second bus and replace said invalid bytes of data from said second bus with said data from said first bus in accordance with said coded signal.

25. The computer system as recited in claim 24, wherein said second I/O device is adapted to provide an ACK signal when said second I/O device contains said first address, said I/O bus interface reads said data on said second bus if said second I/O device provides said ACK signal, said I/O bus interface includes a timer that count s a time interval from said first data request, said CPU reads said data on said first bus if said second I/O device does not provide s aid ACK signal within said time interval.

26. The computer system as recited in claim 24, wherein said second bus is a byte wide and said second data rate is 500 Mbits/sec.

27. A method of transferring data, comprising:
a) sending a first data request from a CPU onto a first bus, and a second bus;
b) sending an ACK signal from a second I/O device on said second bus;
c) sending data onto said second bus;
d) sending data onto said first bus;
e) reading said data on said second bus if said ACK signal is generated;
f) counting a time interval from said first data request; and,
g) reading said data on said first bus if said ACK signal is not generated within said time interval.

28. A method of transferring data, comprising:
a) sending a first data request from a CPU onto a first bus and a second bus;
b) sending at least two bytes of data from a first I/O device onto said first bus;
c) sending at least two bytes of data from a second I/O device onto said second bus;
d) sending an enable byte from said second I/O device onto said second bus, said enable byte indicating which data bytes on said second bus contain invalid data;
e) storing said data bytes on said second bus;
f) receiving said enable byte; and
g) replacing said invalid data bytes of said data bytes stored from said second bus with said data bytes stored from said first bus.

29. A computer system, comprising:
a central processing unit (CPU) that can generate a first data request that includes
a first address;
a first bus;
a second bus;
a first bus interface operatively connected to said CPU and said first bus to generate a first request packet in response to said first data request from said CPU, said first request packet including said first address;
a second bus interface operatively connected to said CPU and said second bus to generate a second request packet in response to said first data request from said CPU, said second request packet including said first address;
a cache memory coupled to said first bus interface by said first bus to provide a plurality of cache memory locations, said cache memory being adapted to provide an ACK signal if said first address is contained within said cache memory locations, and to provide a NACK signal if said first address is not contained within said cache memory locations; and,
a memory coupled to said second bus interface by said second bus to provide a plurality of memory locations.

30. The computer system as recited in claim 29, wherein said memory contains an internal cache.

31. The computer system as recited in claim 30, wherein said first bus and said second bus are each one byte wide and each transfers data at approximately 500 Mbytes/sec.

32. A method of transferring data, comprising:
a) providing
a central processing unit (CPU), said CPU configured to generate a first data request including a first address,
a first bus,
a second bus,
a first bus interface operatively connected to said CPU and said first bus to generate a first request packet in response to said first data request from said CPU, said first request packet including said first address,
a second bus interface operatively connected to said CPU and said second bus to generate a second request packet in response to said first data request from said CPU, said second request packet including said first address,
a cache memory coupled to said first interface by said first bus to provide a plurality of cache memory locations, said cache memory being adapted to provide an ACK signal if s aid first address is contained within said cache memory locations , and to provide a NACK signal if said first address is not contained within said cache memory locations,
a memory coupled to said second interface by said second bus to provide a plurality of memory locations;
b) sending said first data request from said CPU;
c) generating said first request packet;
d) sending said first request packet onto said first bus;
e) sending said ACK signal from said cache memory to said CPU; and,
f) sending data associated with said first address from said cache memory onto said first bus.

33. The method as recited in claim 32, wherein said cache memory sends said NACK signal and the method further comprises:
g) generating said second request packet; and
h) sending said second request packet onto said second bus .

34. A computer system, comprising:
a central processing unit (CPU) that can generate a first data request that includes a first address;
a first bus;
a first bus interface operatively connected to said CPU and said first bus to generate a first request packet in response to s aid first data request from said CPU, said first request packet including said first address;
a cache memory coupled to said first interface by said first bus to provide a plurality of cache memory locations, said cache memory being adapted to provide an ACK signal if said first address is contained within said cache memory locations, and to provide a NACK signal if said first address is not contained within said cache memory locations;
a memory coupled to said first interface by said first bus to provide a plurality of memory locations; and,
a transceiver operatively connected to said first bus, said transceiver to cause said memory to provide said first address to said CPU when said cache memory provides said NACK signal and to not provide said first address to said CPU when said cache memory provides said ACK signal.

35. The computer system as recited in claim 34, wherein said memory contains an internal cache.

36. The compute r system as recited in claim 35, where in said first bus is on e byte wide and transfers data at approximately 500 Mbytes/sec.

37. A method of transferring data, comprising:
   a) providing;
      a central processing unit (CPU) that can generate a first data request that includes a first address;
      a first bus;
      a first bus interface operatively connected to said CPU and said first bus to generate a first request packet in response to said first data request from said CPU, said first request packet including said first address;
      a cache memory coupled to said first bus interface by said first bus to provide a plurality of cache memory locations, said cache memory being adapted to provide an ACK signal if said first address is contained within said cache memory locations, and to provide a NACK signal if said first address is not contained within said cache memory locations;
      a memory coupled to said first bus interface by said first bus to provide a plurality of memory locations,
      a transceiver operatively connected to said first bus. said transceiver to cause said memory to provide said first address to said CPU when said cache memory provides said NACK signal and to not provide said first address to said CPU when said cache memory provides said ACK signal;
   b) sending said first data request from said CPU;
   c) generating said first request packet;
   d) sending said first request packet onto said first bus;
   e) sending said ACK signal from said cache memory to said CPU; and,
   f) sending data associated with said first address from said cache memory to said first bus interface.

38. The method as recited in claim 37, wherein said cache memory sends said NACK signal and said memory sends data associated with said first address to said first bus interface.

39. The method as recited in claim 38, further comprising. sending said data associated with said first address from said CPU to said cache memory.

40. The computer system as recited in claim 1, further comprising:
   a high speed memory connected to said second bus.

41. A computer system comprising:
   a processor including a bus interface unit;
   a high speed memory bus coupled to the bus interface unit of the processor;
   a second bus coupled to the bus interface unit of the processor;
   a plurality of high speed memory devices coupled in parallel to the high speed memory bus, each of the plurality of high speed memory devices including
      a dynamic random access portion to store data, addresses or instructions, and
      a cache memory portion to interface between the high speed memory bus and the dynamic random access portion.

42. The computer system of claim 41, wherein
   the high speed memory bus is a byte wide and has a data rate greater than or equal to five hundred megabits per second.

43. The computer system of claim 41, wherein
   the high speed memory bus includes a plurality of data lines, an acknowledge line, and a clock line to couple to the processor and the plurality of high speed memory devices.

44. The computer system of claim 41, wherein
   the bus interface unit includes a buffer to store data.

45. The computer system of claim 43, wherein
   the plurality of data lines of the high speed memory bus are a byte wide.

46. The computer system of claim 43, wherein
   the plurality of data lines of the high speed memory bus include a byte wide of data lines and a parity bit.

47. The computer system of claim 43, wherein
   the clock line of the high speed memory bus synchronizes the data transmission between the processor and the plurality of high speed memory devices.

48. The computer system of claim 42, wherein
   the second bus is a byte wide an d has a data rate greater than or equal to five hundred megabits per second.

49. The computer system of claim 47, wherein
   the bus interface unit to transmit a request packet onto the high speed memory bus in response to the processor requesting data transmission with one of the plurality of high speed memory devices.

50. The computer system of claim 49, wherein
   the request packet includes a start bit, a memory address, and a code indicating how many bytes of data are requested and whether a read memory or write memory operation is requested.

51. The computer system of claim 49, wherein
   the plurality of high speed memory devices decode the memory address to obtain the device ID address and determine if it matches their device ID.

52. The computer system of claim 49, wherein
   the one of the plurality of high speed memory devices with the device ID address matching their device ID further to decode the memory address to determine if the memory location requested is within the cache memory portion.

53. The computer system of claim 49, wherein
   the one of the plurality of high speed memory devices with the device ID address matching their device ID further decodes the memory address and determines the memory location requested is within its cache memory portion and transmits an ACK signal onto the acknowledgement line.

54. The computer system of claim 49, wherein
   the one of the plurality of high speed memory devices with the device ID address matching their device ID further decodes the memory address and determines the memory location requested is not within its cache memory portion and transmits a NACK signal onto the acknowledgement line.

* * * * *

UNITED STATES PATENT AND TRADEMARK OFFICE
CERTIFICATE OF CORRECTION

PATENT NO.     : 6,412,033 B1
DATED          : June 25, 2002
INVENTOR(S)    : Gray et al.

It is certified that error appears in the above-identified patent and that said Letters Patent is hereby corrected as shown below:

<u>Column 12,</u>
Line 16, delete "110", insert -- I/O --.

<u>Column 14,</u>
Line 51, delete "s aid", and insert -- said --.

Signed and Sealed this

Fifth Day of August, 2003

JAMES E. ROGAN
*Director of the United States Patent and Trademark Office*